United States Patent
Erhard et al.

(10) Patent No.: US 12,412,673 B2
(45) Date of Patent: Sep. 9, 2025

(54) DEBRIS FILTER FOR A NUCLEAR FUEL ASSEMBLY BOTTOM END PART AND METHOD OF MANUFACTURING SUCH A DEBRIS FILTER

(71) Applicant: FRAMATOME, Courbevoie (FR)

(72) Inventors: Friedrich Erhard, Eckental (DE); Sven Finzel, Forchheim (DE); Christoph Kraus, Heiligenstadt (DE); Dirk Blavius, Erlangen (DE); Stefan Hofbeck, Nuremberg (DE); Shawn Heath, Eggolsheim (DE)

(73) Assignee: FRAMATOME, Courbevoie (FR)

( * ) Notice: Subject to any disclaimer, the term of this patent is extended or adjusted under 35 U.S.C. 154(b) by 468 days.

(21) Appl. No.: 17/766,148

(22) PCT Filed: Oct. 2, 2020

(86) PCT No.: PCT/EP2020/077655
§ 371 (c)(1),
(2) Date: Apr. 1, 2022

(87) PCT Pub. No.: WO2021/064170
PCT Pub. Date: Apr. 8, 2021

(65) Prior Publication Data
US 2022/0344065 A1    Oct. 27, 2022

(30) Foreign Application Priority Data
Oct. 4, 2019 (EP) .................................... 19306286

(51) Int. Cl.
*G21C 3/32* (2006.01)
*G21C 3/33* (2006.01)

(52) U.S. Cl.
CPC .......... *G21C 3/3206* (2013.01); *G21C 3/3305* (2013.01)

(58) Field of Classification Search
CPC ..... G21C 3/3305; G21C 3/3206; G21C 3/322
See application file for complete search history.

(56) References Cited

U.S. PATENT DOCUMENTS

| 4,678,627 A * | 7/1987 | Rylatt | ................... | G21C 3/32 |
| | | | | 976/DIG. 207 |
| 4,781,884 A * | 11/1988 | Anthony | ................. | G21C 3/32 |
| | | | | 376/439 |

(Continued)

FOREIGN PATENT DOCUMENTS

| CN | 109863565 A | 6/2019 |
| EP | 0705477 B1 * | 3/1997 |

(Continued)

OTHER PUBLICATIONS

Hull, Amy B., "Review of Additive Manufacturing for Reactor Materials & Components." Office of Nuclear Regulatory Research, NRC Workshop on Vendor Oversight, p. 1-12, Jun. 2018.

(Continued)

*Primary Examiner* — Lily C Garner
(74) *Attorney, Agent, or Firm* — Davidson Kappel LLC

(57) ABSTRACT

A debris filter configured for a nuclear fuel assembly bottom end part includes a lower nozzle (8) and the debris filter (18) is supported by the lower nozzle (8). The debris filter (18) has an inlet face (18A) and an outlet face (18B) opposed to the inlet face (18A), and comprises at least one filtering section (18D) that has a retention capacity that increases gradually or stepwise towards from the inlet face (18A) to the outlet face (18B).

7 Claims, 8 Drawing Sheets

(56) References Cited

U.S. PATENT DOCUMENTS

| | | | | | |
|---|---|---|---|---|---|
| 4,900,507 | A | * | 2/1990 | Shallenberger | G21C 3/3206 376/443 |
| 5,024,806 | A | * | 6/1991 | Cioffi | G21C 3/32 138/40 |
| 5,030,412 | A | * | 7/1991 | Yates | G21C 3/3206 376/442 |
| 5,094,802 | A | * | 3/1992 | Riordan, III | G21C 3/32 376/443 |
| 7,822,165 | B2 | * | 10/2010 | Broach | G21C 3/3206 376/362 |
| 9,583,222 | B2 | * | 2/2017 | Friedrich | G21C 3/32 |
| 10,923,237 | B2 | * | 2/2021 | Smith | G21C 19/307 |
| 11,120,918 | B2 | * | 9/2021 | Aleshin | G21C 3/3206 |
| 2011/0170651 | A1 | * | 7/2011 | Knabe | G21C 3/3206 376/313 |
| 2011/0268240 | A1 | * | 11/2011 | Huq | G21C 19/307 376/440 |
| 2013/0248434 | A1 | * | 9/2013 | Owaki | B01D 29/01 210/236 |
| 2018/0268949 | A1 | * | 9/2018 | Aleshin | G21C 19/307 |
| 2019/0198183 | A1 | * | 6/2019 | Söderberg | G21C 19/307 |
| 2020/0373025 | A1 | * | 11/2020 | Aleshin | G21C 3/3206 |
| 2022/0215971 | A1 | * | 7/2022 | Huegel | G21C 3/12 |
| 2022/0406476 | A1 | * | 12/2022 | Blavius | G21C 21/00 |

FOREIGN PATENT DOCUMENTS

| | | | |
|---|---|---|---|
| EP | 2164076 | A1 | 3/2010 |
| EP | 2204819 | A1 | 7/2010 |
| JP | H063480 | A | 1/1994 |
| JP | H0634780 | A * | 2/1994 |
| JP | H11133176 | A | 5/1999 |
| JP | 1997166675 | A | 6/1999 |
| JP | 2001116873 | A | 4/2001 |
| JP | 2002323585 | A | 11/2002 |
| RU | 2627307 | C1 * | 8/2017 |
| WO | WO2018170428 | A1 | 9/2018 |

OTHER PUBLICATIONS

Corresponding Search Report for PCT/EP2020/077655.
Corresponding Search Report for EP 1936286.6.

* cited by examiner

DEBRIS FILTER FOR A NUCLEAR FUEL ASSEMBLY BOTTOM END PART AND METHOD OF MANUFACTURING SUCH A DEBRIS FILTER

The present disclosure relates to nuclear fuel assemblies for use in nuclear reactors, in particular to nuclear fuel assemblies for use in a light water nuclear reactor.

BACKGROUND

A nuclear fuel assembly for a light water reactor generally comprises a bundle of fuel rods extending along a longitudinal axis with being supported longitudinally and transversely in a spaced relationship by a support structure.

In use, a plurality of nuclear fuel assemblies are positioned vertically and arranged side-by-side in a reactor vessel, thus forming a reactor core, and a coolant fluid, e.g. water, is caused to flow vertically through the nuclear fuel assemblies. The coolant fluid has the function of moderating the nuclear reaction and retrieving heat from the fuel rods of the nuclear fuel assemblies.

Debris present in the coolant fluid may potentially damage the fuel rods of the nuclear fuel assembly and to hinder this risk, the nuclear fuel assembly may be provided with a bottom end part including a lower nozzle for receiving the coolant fluid flow and a debris filter, e.g. as disclosed in EP2204819A1 and EP2164076A1.

SUMMARY

One of the aims of the present disclosure is to make it possible to provide a nuclear fuel assembly bottom end part debris filter that efficiently traps debris with low or adaptable pressure losses, the debris filter being preferably easy to manufacture.

To this end, the present disclosure provides a debris filter for a nuclear fuel assembly bottom end part comprising a lower nozzle and the debris filter supported by the lower nozzle, the debris filter having an inlet face and an outlet face opposed to the inlet face, wherein the debris filter comprises at least one filtering section that has a retention capacity that increases gradually or stepwise towards from the inlet face to the outlet face.

With increasing retention capacity from the inlet face towards the outlet face, bigger debris are retained adjacent the inlet face and smaller debris penetrate into the debris filter but are retained adjacent the outlet face of the debris filter.

A layer or portion of the debris filter with lower retention capacity and/or flow openings of larger dimensions can be made mechanically more resistant than a layer or portion of the debris filter with higher retention capacity and/or flow openings of smaller dimensions.

The layer with higher retention capacity can be provided with walls thinner than that of the layer with lower retention capacity for maximizing the number of flow openings and limiting pressure losses through the debris filter.

In specific embodiments, the debris filter comprises one or several of the following optional features, taken in isolation or in any technically feasible combination:
the debris filter comprises several superimposed filtering layers located one above the other between the inlet face and the outlet face, the filtering layers having different retention capacities;
each preceding filtering layer has a retention capacity strictly inferior to that of the next filtering layer when considering the filtering layers from the inlet face to the outlet face;
it further comprising a plurality of filtering structures protruding on the inlet face of the debris filter, each filtering structure having a structure base and a structure apex spaced along a structure axis, each filtering structure comprising blades distributed circumferentially around the structure axis, each blade having one end connected to the structure base and one end connected to the structure apex, each blade delimiting a slot with each adjacent blade of the same filtering structure;
each blade circumferentially overlaps each adjacent blade of the same filtering structure;
each blade of each filtering structure extends helically around the structure axis of said filtering structure;
each filtering structure is configured to impart a cyclone effect or a swirl around the structure axis to a fluid flowing through the filtering structure.

The also relates to a nuclear fuel assembly comprising a bottom end part comprising a debris filter as defined above.

The also relates to a method of manufacturing a debris filter as per any one of the preceding claims, comprising manufacturing the debris filter at least partly by additive manufacturing.

In specific embodiments, the manufacturing method comprises one or several of the following optional features, taken in isolation or in any technically feasible combination:
the debris filter is at least partly build up onto the lower nozzle by additive manufacturing;
at least two of the filtering layers are manufactured separately and assembled together to obtain the debris filter;
at least two filtering layers are made integrally in a single piece of material by additive manufacturing.

BRIEF SUMMARY OF THE DRAWINGS

The present disclosure and its advantages will be better understood upon reading the following description given solely by way of example and made with reference to the appended drawings, in which.

DETAILED DESCRIPTION

Figure 1:
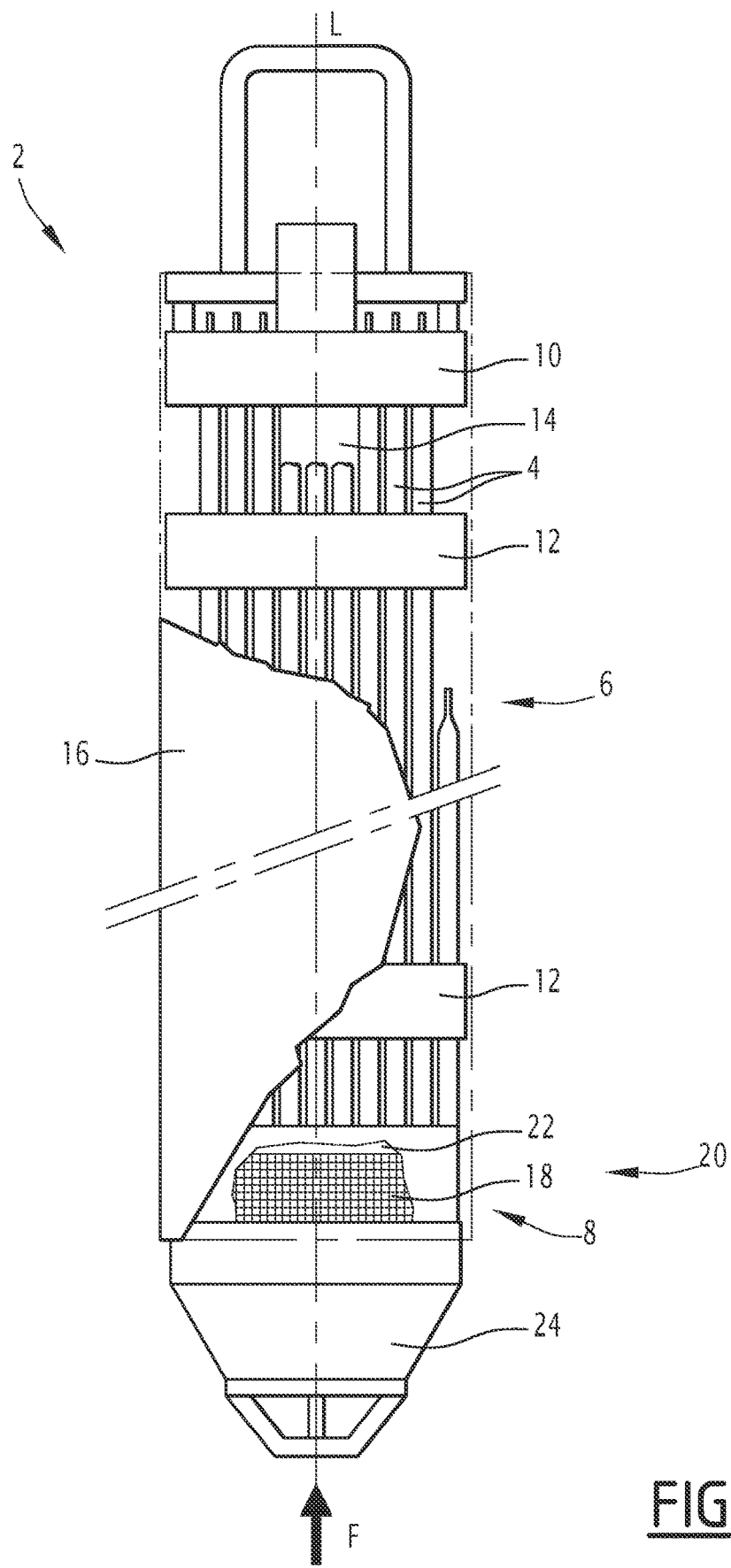
FIG. 1 is a side elevation view of a BWR nuclear fuel assembly.

The nuclear fuel assembly 2 illustrated on FIG. 1 is elongated along a longitudinal axis L. In use, the nuclear fuel assembly is positioned in a nuclear reactor core with the longitudinal axis L extending substantially vertically, the nuclear fuel assembly resting on a lower core plate.

In the following, unless otherwise specified, the terms "longitudinal", "transversal", "vertical", "horizontal", "top", "bottom", "upper" and "lower" are used with reference to the use position of the nuclear fuel assembly 2.

The nuclear fuel assembly 2 comprises a bundle of fuel rods 4 that are elongated and extend parallel to each other along the longitudinal axis L.

Each fuel rod 4 comprises a tubular cladding receiving nuclear fuel, e.g. pellets of nuclear fuel stacked in the tubular cladding, and end caps closing the ends of the tubular cladding.

The nuclear fuel assembly 2 comprises a support structure 6 supporting the fuel rods 4 longitudinally and transversely.

The support structure 6 is configured to maintain the fuel rods 4 transversely in a spaced relationship. The fuel rods 4 are e.g. arranged in a lattice, at the nodes of an imaginary network, preferably a regular network. The transversal spacing between the fuel rods allows coolant fluid to flow between the fuel rods mainly longitudinally.

The support structure 6 of the nuclear fuel assembly 2 comprises a lower nozzle 8, an upper nozzle 10 and supporting grids 12 distributed along the fuel rods 4. The fuel rods 4 extend between the lower nozzle 8 and the upper nozzle 10 with passing through the spacer grids 12. The function of the spacer grids 12 is to maintain the fuel rods 4 longitudinally and transversely in the spaced relationship.

The nuclear fuel assembly 2 of FIG. 1 is for use in a boiling water reactor (BWR).

The armature 6 comprises a water channel 14 (or "water rods") incorporated inside the bundle of fuel rods 4 by replacing fuel rods 4 in the lattice and a fuel channel 16 surrounding the bundle of fuel rods 4.

The water channel 14 and the fuel channel 16 extend between the lower nozzle 8 and the upper nozzle 10 with being connected to the lower nozzle 8 and the upper nozzle 10. The spacer grids 12 are attached onto the water channel 14 are distributed at various positions along the water channel 14.

In use, the nuclear fuel assembly 2 is positioned vertically on a lower core plate with the lower nozzle 8 receiving a flow of coolant fluid which passes through the lower nozzle 8 and into to the bundle of fuel rods 4, as illustrated by arrow F.

The nuclear fuel assembly 2 comprises a debris filter 18 positioned inside the lower nozzle 8. The lower nozzle 8 and the debris filter 18 define together a bottom end part 20 of the nuclear fuel assembly 2.

The debris filter 18 is configured for trapping debris present in the coolant fluid entering the nuclear fuel assembly 2 via the lower nozzle 8.

Figure 2:
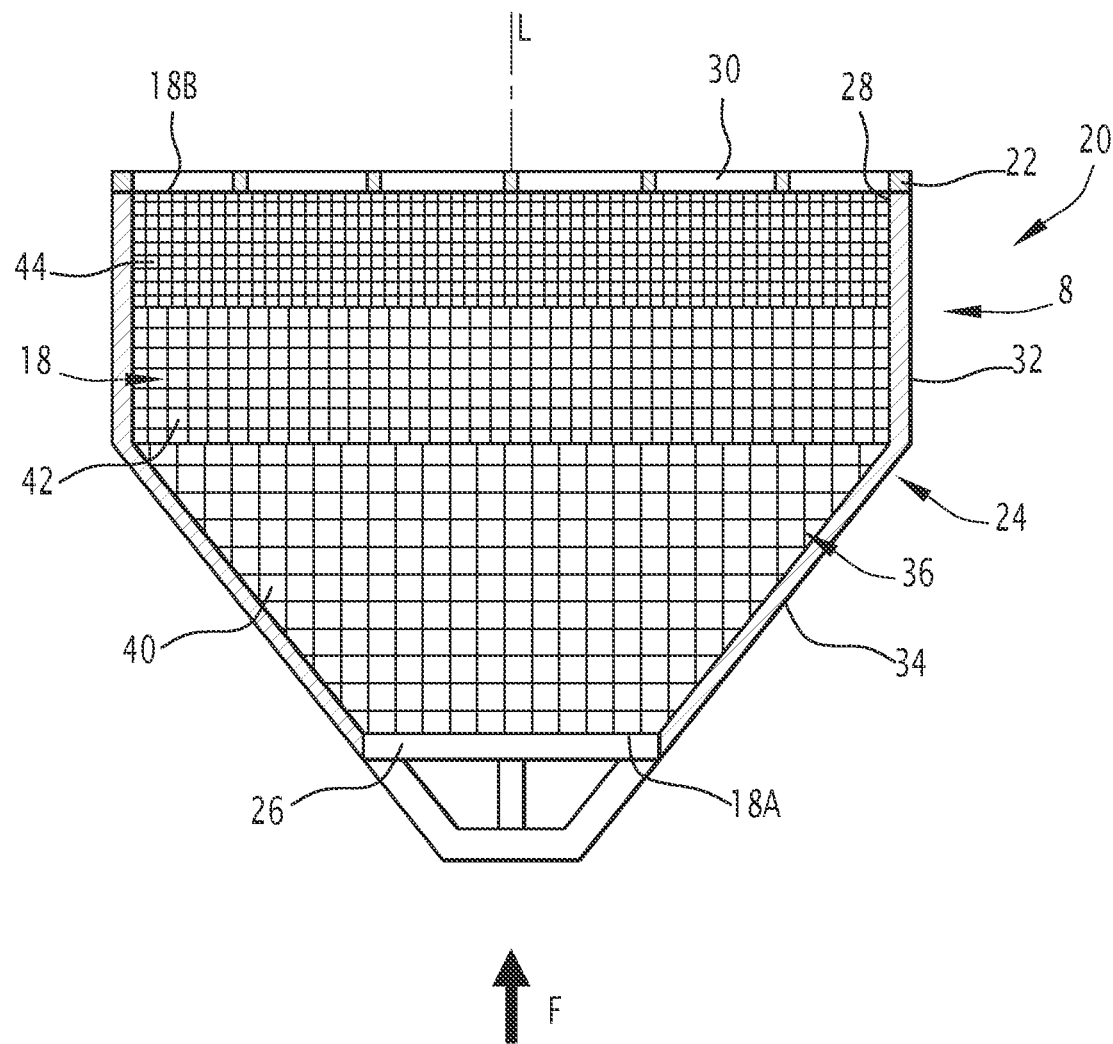
FIG. 2 is a sectional view of a bottom end part of the nuclear fuel assembly.

As illustrated on FIG. 2, the lower nozzle 8 comprises a lower tie plate 22 and a nozzle part 24.

The lower tie plate 22 is configured notably for attaching the water channel 14 and the fuel channel 16 thereto. The nozzle part 24 is configured for receiving the coolant fluid flow and channeling it to the water channel 14 and the fuel channel 16.

The nozzle part 24 is tubular and extends downwardly from the periphery of the lower tie plate 22. The nozzle part 24 comprises a lower inlet 26 and an upper outlet 28.

The lower tie plate 22 extends across the upper outlet 28 of the nozzle part 24. The lower tie plate 22 has the shape of a grid. The lower tie plate 22 has fluid flow openings 30 for the coolant fluid to flow through the lower tie plate 22.

The nozzle part 24 has for example an upper section 32 of constant cross-section extending downwardly from the lower tie plate 22 and a lower section 34 of conical shape tapering downwardly.

The nozzle part 24 defines an internal space 36. The internal space 36 is delimited between the lower inlet 26 and the upper outlet 28 of the nozzle part 24.

The debris filter 18 is housed inside the lower nozzle 8, more specifically here inside the nozzle part 24 and below the lower tie plate 22. The debris filter 18 is located upstream the lower tie plate 22 when considering the coolant fluid flow in use. The debris filter 18 may be in contact with the underside of the lower tie plate 22. Alternatively, a slight gap may be provided between the debris filter 18 and the underside of the lower tie plate.

The debris filter 18 is preferably at least partly manufactured by additive manufacturing.

Additive manufacturing refers to a manufacturing method in which the debris filter 18 or at least a part of the debris filter 18 is progressively manufactured by adding material to an already manufactured portion.

Additive manufacturing refers in particular to progressively manufacturing at least a part of the debris filter by progressively adding manufacturing layers successively.

The debris filter 18 is at least partly manufactured by additive manufacturing e.g. by using one of or a combination of the following additive manufacturing methods: powder bed additive manufacturing, in particular fusion, sintering or adhesive bonding), deposition additive manufacturing, in particular powder deposition additive manufacturing or wire deposition additive manufacturing, material Jetting additive manufacturing and binder jetting additive manufacturing.

In one embodiment, the debris filter 18 is only partially manufactured by additive manufacturing.

In one example, a first portion of the debris filter 18 is manufactured and a second portion of the debris filter 18 is built up onto the first portion by additive manufacturing.

The first portion is preferably manufactured using a manufacturing method that is not additive manufacturing method. The first portion is e.g. manufacture by conventional milling of forged metal plates or casting.

In another example, a first portion and a second portion of the debris filter 18 are manufactured separately, each of the first portion and the second portion being manufactured respectively by additive manufacturing, and the first portion and the second portion are then assembled together to obtain the debris filter 18.

In the above examples, the first portion is for example made of metal. The second portion is for example made of metal. The metal of the first portion and the metal of the second portion are the same metal or different metals.

In one embodiment, the debris filter 18 is entirely manufactured by additive manufacturing. The debris filter is thus made integrally in a single piece of material obtained by additive manufacturing.

In one embodiment, the debris filter 18 is manufactured separately from the lower nozzle 8 and is then assembled to the lower nozzle 8.

For example, a method of manufacturing the bottom end part 20 comprises manufacturing the nozzle part 24, the lower tie plate 22 and the debris filter 18 separately and then assembling them.

In one embodiment, the debris filter 18 is built up onto the lower nozzle 8 by additive manufacturing.

The manufacturing method comprises for example manufacturing the lower tie plate 22, then building up the debris filter 18 onto the lower tie plate 22 by additive manufacturing, and then assembling the nozzle part 24 to the lower tie plate 22.

Alternatively, the manufacturing method comprises for example manufacturing the nozzle part 24, then building up the debris filter 18 onto the nozzle part by additive manufacturing, and then assembling the lower tie plate 22 to the nozzle part 24.

As illustrated on FIG. 2, in one embodiment, the debris filter 18 extends along the longitudinal axis L over the majority of the extend E of the internal space 36 of the nozzle part 24 along the longitudinal axis L.

Manufacturing the debris filter 18 at least in part by additive manufacturing allows providing a debris filter 18 that is thick to improve filtering efficiency whilst limiting pressure losses of the coolant fluid flowing through the debris filter 18.

The nozzle part 24 comprises here an upper portion 32 and a downwardly tapering lower portion 34.

In one embodiment, the debris filter 18 extends in the upper portion 32 of the nozzle part 24 at least down to the lower portion 34 of the nozzle part 24.

In one embodiment, the debris filter 18 extends in the upper portion 32 and in at least part of the lower portion 34 of the nozzle part 24.

In a specific embodiment, as illustrated on FIG. 2, the debris filter 18 fully occupies the internal space 36 of the lower nozzle 8 between the lower inlet 26 and the upper outlet 28 of the nozzle part 24.

The debris filter 18 comprises an inlet face 18A and an outlet face 18B opposed to the inlet face 18A. In use, the coolant fluid enters the debris filter 18 via the inlet face 18A and exits the debris filter via the outlet face 18B. The inlet face 18A is adjacent the lower inlet 26 of the nozzle part 24 and the outlet face 18B faces the lower tie plate 22.

The debris filter 18 is porous or has an openwork such as to allow coolant fluid to pass through the debris filter whilst retaining debris contained in the coolant fluid. The debris filter 18 comprises flow openings for allowing coolant fluid to flow through the debris filter 18 from the inlet face 18A to the outlet face 18B. Debris having dimensions greater than that of the flow openings will be retained by the debris filter 18.

The debris filter 18 has a retention capacity that corresponds to the size of the smallest debris that can be retained in the debris filter 18. The higher the retention capacity, the smaller the size of the smallest debris retained by the debris filter 18.

The debris filter 18 will retain debris having dimensions larger than the dimensions of the flow openings. The smaller the dimensions of the flow openings, the higher the retention capacity of the debris filter 18.

In one embodiment, the debris filter 18 has a retention capacity that varies from the inlet face 18A to the outlet face 18B, and more specifically a retention capacity that progressively increases from the inlet face 18A to the outlet face 18B of the debris filter 18.

In view of progressively increasing the retention capacity through the thickness of the debris filter 18, the debris filter 18 has for example flow openings that have dimensions that progressively diminish through the debris filter 18 from the inlet face 18A to the outlet face 18B of the debris filter 18.

With the progressively increasing retention capacity, the biggest debris are retained adjacent the inlet face 18A of the debris filter 18 and smallest debris 18 penetrate into the debris filter 18 but are retained adjacent the outlet face of the debris filter 18.

One advantage of such configuration is that a layer or portion of the debris filter with lower retention capacity and/or flow openings of larger dimensions can be made mechanically more resistant than a layer or portion of the debris filter with higher retention capacity and/or flow openings of smaller dimensions. The layer with higher retention capacity can be provided with walls thinner than that of the layer with lower retention capacity for maximizing the number of flow openings and limiting pressure losses through the debris filter 18.

The additive manufacturing of the debris filter 18 allows tuning the retention capacity of the debris filter 18 easily and notably providing a debris filter 18 with a retention capacity varying from the inlet face 18A to the outlet face 18B, in particular a retention capacity increasing gradually or stepwise from the inlet face 18A to the outlet face 18B, with limiting manufacturing cost and limiting pressure losses.

The retention capacity of the debris filter 18 increases for example gradually or stepwise from the inlet face 18A to the outlet face 18B of the debris filter 18. For example, the debris filter 18 has flow openings having dimensions that vary gradually or stepwise from the inlet face 18A to the outlet face 18B of the debris filter 18.

In the example illustrated on FIG. 2, the debris filter 18 has a retention capacity that increases stepwise from the inlet face 18A to the outlet face 18B. For example, the debris filter 18 has flow openings having dimensions that vary stepwise from the inlet face 18A to the outlet face 18B.

The debris filter 18 has for example several filtering layers 40, 42, 44 from the inlet face 18A to the outlet face 18B, each following layer having a higher retention capacity than the preceding layer when considering the filtering layers from the inlet face 18A to the outlet face 18B.

Each filtering layer 40, 42, 44 has for example a constant retention capacity through the thickness of this filtering layer 40, 42, 44.

Each following filtering layer has e.g. flow openings of smaller dimensions than that of the preceding filtering layer when considering the filtering layers from the inlet face 18A to the outlet face 18B.

The debris filter 18 thus has at least an inlet filtering layer 40 adjacent to the inlet face 18A that has a lower retention capacity and an outlet filtering layer 44 adjacent to the outlet face 18B of the debris filter 18. The inlet filtering layer 40 has e.g. flow openings of larger dimensions than the flow openings of the outlet filtering layer 44.

In one embodiment, the debris filter has exactly two filtering layers, i.e. the inlet filtering layer 40 and the outlet filtering layer 44.

In another embodiment, the debris filter 18 has at least one intermediate filtering layer 42 interposed between the inlet filtering layer 40 and the outlet filtering layer 44.

In the example illustrated on FIG. 2, the debris filter 18 has exactly one intermediate filtering layer 42. In a variant, the debris filter 18 has more than two intermediate filtering layers and more than three filtering layers.

In one embodiment of the manufacturing method, the filtering layers 40, 42, 44 of the debris filter 18 with different retention capacities are manufactured integrally in one piece of material by additive manufacturing. In this case, the debris filter 18 is manufactured integrally in one piece of material by additive manufacturing.

In another embodiment, at least two filtering layers 40, 42, 44 are manufactured separately and then at least two filtering layers 40, 42, 44 are assembled together to obtain the debris filter 18. The assembly is operated e.g. by welding, bonding, screwing, riveting . . . .

Figure 3:
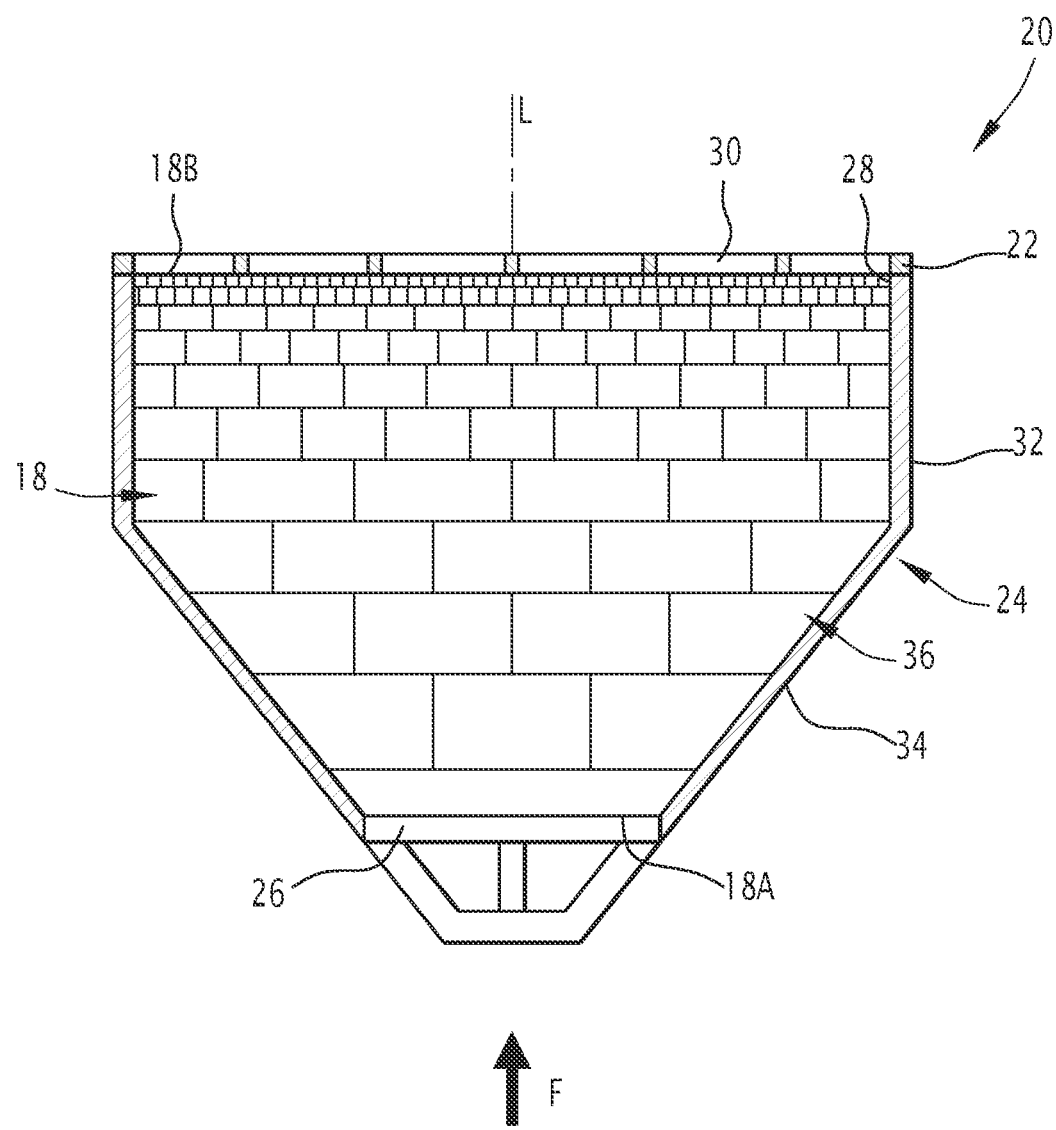
FIG. 3 is a sectional view of a bottom end part according to another embodiment.

As illustrated on FIG. 3, in one embodiment, the debris filter 18 has a retention capacity that gradually increases.

The debris filter 18 with gradually increasing retention capacity exhibits a gradient of retention capacity from the inlet face 18A to the outlet face 18B. The flow openings of the debris filter 18 exhibit e.g. a gradient of diminishing dimensions from the inlet face 18A to the outlet face 18B.

The manufacture of the debris filter 18 by additive manufacturing allows imparting complex three-dimensional shapes to the debris filter 18 that may improve filtering whilst limiting pressure losses through the debris filter.

Figure 4:
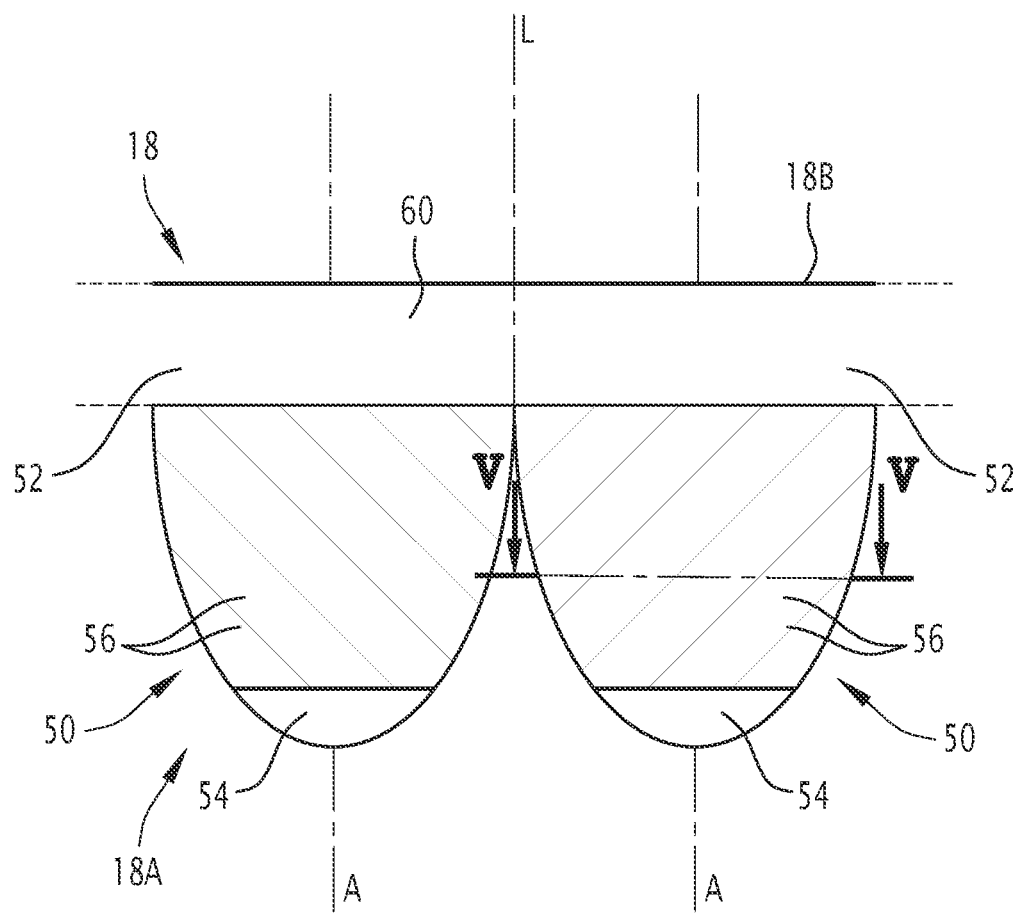
FIG. 4 is a partial side view of a debris filter.
Figure 5:
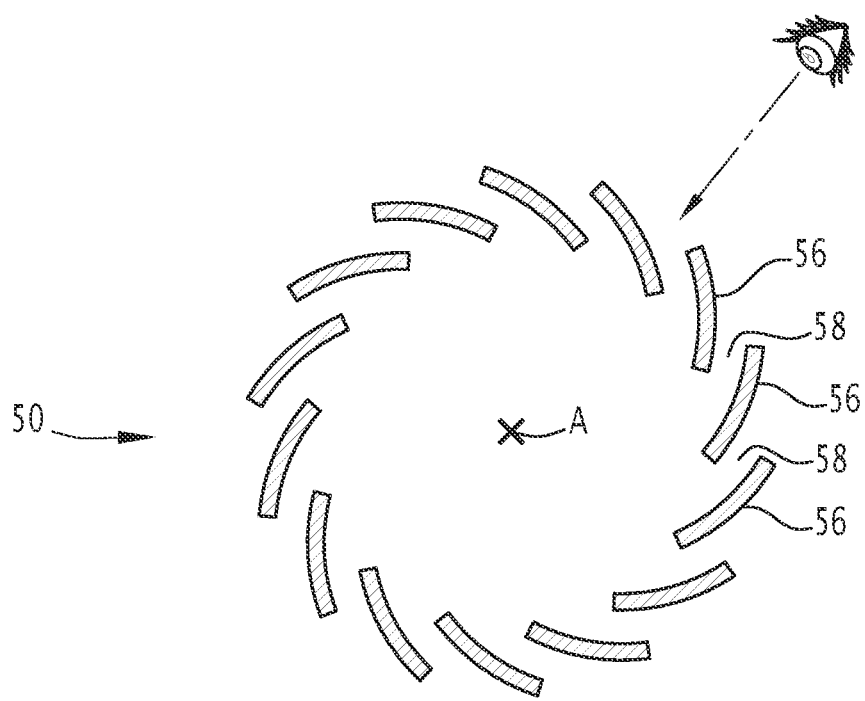
FIG. 5 is a sectional view of a filtering structure of the debris filter of FIG. 4, taken along V-V on FIG. 4.
Figure 6:
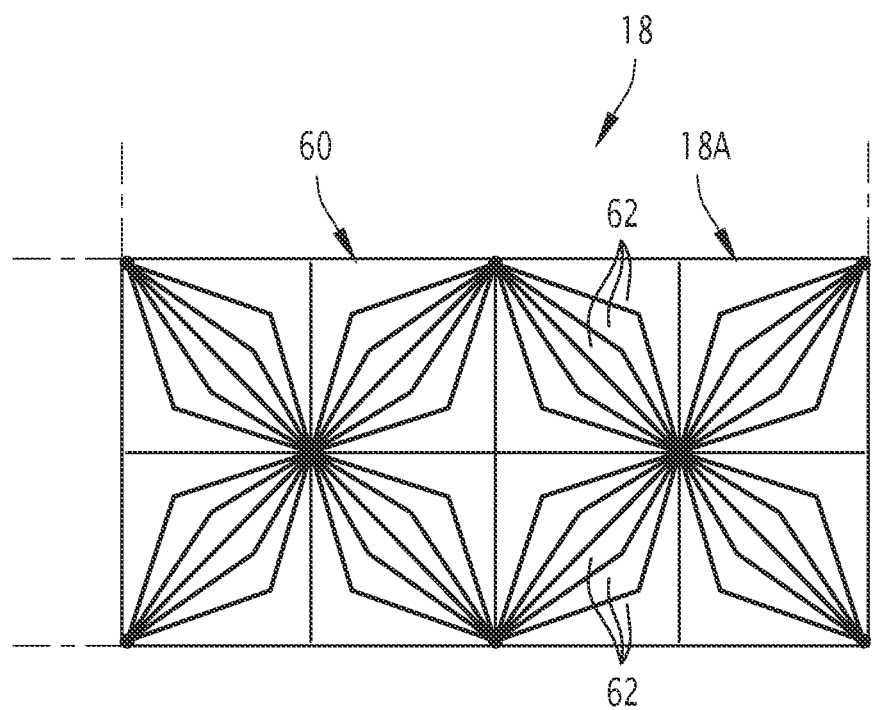
FIG. 6 is a partial top view of the debris filter of FIG. 4.

FIGS. 4-6 illustrated one example of a debris filter 18 with a complex three-dimensional shape that can be obtained by additive manufacturing.

As illustrated on FIGS. 4-6, the debris filter 18 has an inlet face 18A and an outlet face 18B.

The debris filter 18 is provided on its inlet face 18A with a plurality of protruding filtering structures 50. Each filtering structure 50 is configured for allowing coolant fluid to flow through the filtering structure 50 while trapping the debris.

Each filtering structure 50 is hollow. Each filtering structure 50 has a structure base 52 and a structure apex 54 spaced along a structure axis A and a plurality of blades 56 distributed circumferentially around the structure axis A with defining slots 58 between them. Each blade 56 has one end connected to the structure base 52 and one end connected to the structure apex 54. Each blade 56 is located circumferentially between two adjacent blades 56 with defining a respective slot 58 with each of the two adjacent blades 56.

Each blade 56 has two lateral edges that are free. Each blade 56 extends like a bridge between its two ends connected respectively to the structure base 52 and the structure apex 54.

Each filtering structure 50 has a overall shape tapering from the structure base 52 to the structure apex 54. The transversal dimensions of each filtering structure 50, taken transversely to structure axis A, progressively diminish along the structure axis A, from the structure base 52 to the structure apex 54. Each filtering structure 50 has for example an overall ogive shape.

The structure axis A of the plurality of filtering structures 50 are preferably parallel. The structure axis A of each filtering structure 50 is preferably substantially perpendicular to the outlet face 18B of the debris filter 18. The structure axis A of each filtering structure 50 is preferably parallel to the longitudinal axis of the nuclear fuel assembly 2 when the debris filter 18 is mounted thereon.

The structure bases 52 of the filtering structures 50 are connected together. The structure bases 52 define together an outlet portion 60 of the debris filter 18 defining the outlet face 18B of the debris filter 18.

The filtering structures 50 impart a three-dimensional shaped to the inlet face 18A of the debris filter 18. The outlet face 18A of the debris filter 18 is for example substantially flat. The outlet face 18A of the debris filter is provided with outlet openings 62 for allowing the coolant fluid to exit the debris filter 18.

Each filtering structure 50 delimits a trapping volume delimited along the structure axis A by the structure base 52 and the structure apex 54 and delimited laterally by the blades 56.

The slots 58 delimited between the blades 56 allow the coolant fluid to enter inside the filtering structure 50 and the outlet openings 62 provided into the outlet face 18B allow the coolant fluid to exit the filtering structure 50 and thus the debris filter 18.

The outlet face 18B of the debris filter 18 exhibits e.g. a plurality of elongated outlet openings 62 extending in different transverse directions. Advantageously, as illustrated on FIG. 5, the blades 56 of each filtering structure 50 are distributed around the structure axis A with a circumferential overlap between the adjacent blades 56.

Each blade 56 overlaps each adjacent blade 56 when looking in a direction that is radial relative to the structure axis A, as illustrated by arrow V on FIG. 5. In other words, the slots 58 are not see-through when looking in a direction that is radial relative to the structure axis A.

Preferably, each filtering structure 50 are configured to impart to the coolant flow flowing through the filtering structure 50 a cyclone effect or a swirl around the structure axis A of the filter structure 50.

Such a filtering structure 50 is particularly efficient to trap debris in the shape of small wires, which are very dangerous for the nuclear fuel assembly 2 because of the fretting mechanism. Owing to the cyclone effect, such debris are likely to be pressed into the filtering structure 50, thus being prevented from exiting the filtering structure 50.

In one exemplary embodiment, the blades 56 of each filtering structure 50 are configured to generate the cycling effect with imparting to the coolant flow a cyclone effect or a swirl around the structure axis A of the filter structure 50.

As visible on FIG. 4, advantageously, the blades 56 of each filtering structure 50 extend helically around the structure axis A. This improve trapping of elongated debris oriented longitudinally when reaching the inlet face of the debris filter 18.

The helical structure works like a cyclone and throw the debris outwards into the filtering structure 50.

In addition, such debris structure 50 tends to deviate the coolant flow with imparting transverse velocity to the coolant flow downstream the debris filter 18. This can promote heat exchange between the coolant fluid and the nuclear fuel rods 4.

The debris filter 18 is very efficient for filtering debris, whilst limiting pressure loss. The debris filter has a complex shape but can be manufactured easily by additive manufacturing.

At least the filtering structures 50 are manufactured by additive manufacturing. In one embodiment, the entire debris filter is manufacture by additive manufacturing. In another embodiment, the plate-shaped portion 60 is provided and then the remaining of the filtering structures 50 are built up onto the plate-shaped portion 50 by additive manufacturing.

Figure 7:
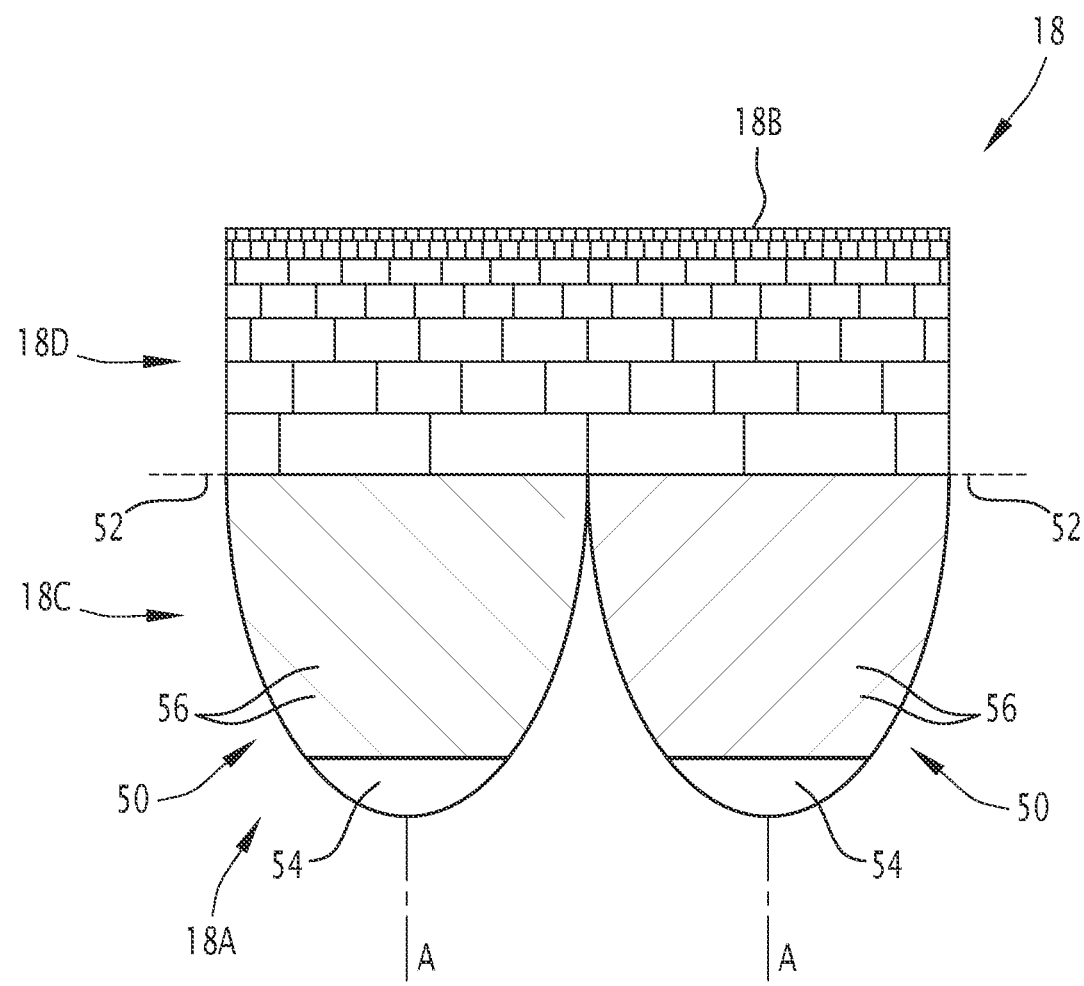
FIG. 7 is a side elevation view of a debris filter.
Figure 8:
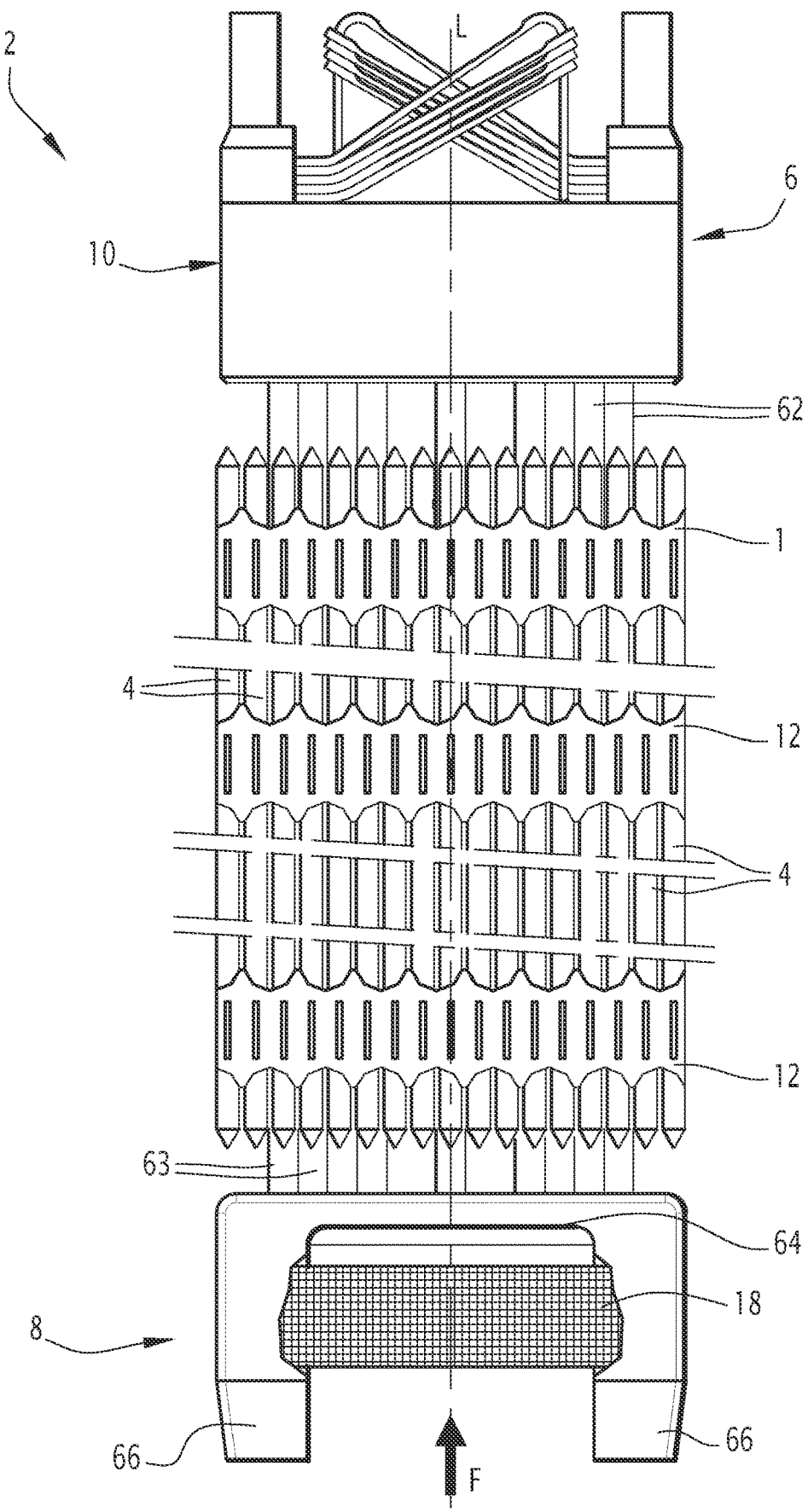
FIG. 8 is a side elevation view of a PWR nuclear fuel assembly.

In one exemplary embodiment illustrated on FIG. 7, a debris filter 18 may combine filtering structures 50 on the inlet face 18A of the debris filter 18 as described in relation to FIGS. 4 and 5, with a retention capacity increasing gradually or stepwise between the filtering structures 50 and the outlet face 18B of the debris filter 18.

Such a debris filter 18 comprises for example an filtering inlet section 18C defined by the filtering structures 50 protruding from the inlet face 18A and an filtering outlet section 18D extending between the filtering structures 50 and the outlet face with exhibiting a retention capacity increasing gradually or stepwise towards the outlet face 18B.

The outlet section 18D comprises for example one or several filtering layer(s) located between inlet section 18C the filtering structures 50 and the outlet face 18B defining, e.g. one filtering layer of gradually increasing retention capacity or several superimposed filtering layers progressively increasing retention capacities, imparting a retention capacity increasing stepwise to the outlet section 18D.

In addition, a debris filter may have a filtering section exhibiting a retention capacity increasing gradually or stepwise associated with another filtering section located upstream or downstream a differing from the filtering structures 50. In a general manner, a debris filter 18 may comprise at least filtering section exhibiting a retention capacity increasing gradually or stepwise from the side of the inlet face 18A to the side of the outlet face 18B.

The present disclosure is not limited to the examples describes and illustrated above. Other examples may be contemplated.

The debris filter 18 with specific debris designs described and illustrated above (increasing retention capacity and/or filtering structure with blades and/or cyclone effect) may be manufactured with other conventional manufacturing method not involving additive manufacturing. Besides, the present disclosure is not limited to BWR nuclear fuel assemblies. More generally, it is applicable to Light Water Reactor (LWR) nuclear fuel assemblies. In particular, it is applicable to Pressurized Water Reactor (PWR) nuclear fuel assemblies.

FIG. 7, in which numeral references to identical or similar elements to those of FIG. 1 are the same, illustrates a PWR nuclear fuel assembly.

The nuclear fuel assembly comprises a bundle of fuel rods 4 extending along a longitudinal axis L and an armature 6 maintaining the fuel rods 4.

The armature 6 comprises a lower nozzle 8 and an upper nozzle 10 spaced along the longitudinal axis L, guide tubes 63 connected to the lower nozzle 8 and the upper nozzle 10 and spacer grids 12 distributed along the guide tubes 63 with being attached to the guide tubes 63.

The lower nozzle 8 is provided with a debris filter 18. The lower nozzle 8 has an egg-crate plate 64 and feet 66 extending downwardly from corners of egg-crate plate 64. In use, the nuclear fuel assembly 2 rests on the lower core plate via the feet 66.

The debris filter 18 is attached to the lower nozzle 8 below the egg-crate plate 64. The debris filter 18 is thus located upstream the egg-crate plate 64. The debris filter 18 is located between the feet 66.

The debris filter 18 may be as per the examples described with reference to the BWR nuclear fuel assembly.

The method of manufacturing the debris filter 18 at least partly by additive manufacturing and the exemplary embodiments and variant described above (additive manufacturing onto the lower nozzle, layers obtained by additive manufacturing and assembled or integrally formed by additive manufacturing . . . ) are advantageous independently from the shape of the debris filter.

Hence, in a general manner, the present disclosure also relates to a method of manufacturing a debris filter for a bottom end part of a nuclear fuel assembly comprising a lower nozzle provided with the debris filter supported by the lower nozzle, the debris filter having an inlet face and an outlet face opposed to the inlet face, the method comprising manufacturing the debris filter at least partly by additive manufacturing.

What is claimed is:

1. A method of manufacturing a nuclear fuel assembly bottom end part comprising a lower nozzle and a debris filter supported by the lower nozzle, the lower nozzle comprising a first part and a second part, the debris filter having an inlet face and an outlet face opposed to the inlet face, the debris filter comprising at least one filtering section that has a retention capacity that increases gradually or stepwise towards from the inlet face to the outlet face, the method comprising:

manufacturing the first part;
   manufacturing the second part;
   manufacturing the debris filter at least partly by building up the debris filter by additive manufacturing onto the first part; and then
   assembling the second part on the first part.

2. The method according to claim 1, wherein the first part is a nozzle part and the second part is a lower tie plate.

3. The method according to claim 1, wherein the debris filter comprises several superimposed filtering layers located one above another between the inlet face and the outlet face, the filtering layers having different retention capacities.

4. The method according to claim 3, wherein each preceding filtering layer has a retention capacity strictly inferior to that of the next filtering layer when considering the filtering layers from the inlet face to the outlet face.

5. The method according to claim 4, wherein at least two of the filtering layers are manufactured separately and assembled together to obtain the debris filter.

6. The method according to claim 4, wherein at least two filtering layers are made integrally in a single piece of material by additive manufacturing.

7. The method according to claim 1, wherein the second part is a nozzle part and the first part is a lower tie plate.

\* \* \* \* \*